United States Patent [19]
DeRose

[11] Patent Number: 5,970,648
[45] Date of Patent: Oct. 26, 1999

[54] DUAL ACTION MULTI-LINE FISH ATTRACTOR

[76] Inventor: Gregory DeRose, P.O. Box 452, Sparrowbush, N.Y. 12780

[21] Appl. No.: 08/972,073

[22] Filed: Nov. 17, 1997

[51] Int. Cl.[6] .................................................. A01K 85/12
[52] U.S. Cl. ........................ 43/42.33; 43/42.51; 43/42.22
[58] Field of Search ............................... 43/42.13, 42.19, 43/42.22, 42.33, 42.46, 42.47, 42.5, 42.51

[56] References Cited

U.S. PATENT DOCUMENTS

| | | | |
|---|---|---|---|
| D. 153,676 | 5/1949 | Gardemeyer | D31/4 |
| D. 363,113 | 10/1995 | Hazelquist | D22/129 |
| 2,215,764 | 9/1940 | Okesson et al. | 43/42.19 |
| 2,235,905 | 3/1941 | Sherwood | 43/42.51 X |
| 2,307,200 | 1/1943 | Cullerton | 43/42.13 X |
| 3,656,253 | 4/1972 | Gaunt | 43/42.33 |
| 4,122,624 | 10/1978 | Smith | 43/42.33 |
| 4,237,644 | 12/1980 | Hansen | 43/43.13 |
| 4,854,071 | 8/1989 | Kendall | 43/42.33 |

FOREIGN PATENT DOCUMENTS 629515  10/1961  Canada .

Primary Examiner—Robert P. Swiatek
Attorney, Agent, or Firm—Sandra M. Kotin

[57] ABSTRACT

A flasher designed for use with a trolling assembly. The flasher is fashioned from a triangular blank having a base slightly longer than the two equal legs. The leg portions are bent to form wings, one upward and the other downward along non-parallel fold lines defining a central portion and running from a point on each leg near the apex of the triangle to points on the base. The fold lines form equal acute angles with a line between the points on each leg. The angles of the fold lines determine the speed of rotation of the flasher about its central axis. The upper and lower surfaces of the two wings and central portion provide six surfaces to which are affixed reflective tape panels. The flasher is connected to the fishing line through a swivel attached at an opening at the apex. One, two or three leaders can be attached at openings at the ends and center along the base. A hook with appropriate lure or bait is at the end of each leader. One leader attached at an end opening will produce a barrel roll motion as the flasher is moved through the water. Two leaders in the end openings, one in the center opening, or three leaders in all three openings produce a steady rotation about the central axis as the flasher moves through the water. The number and positioning of the leaders is determined by the variety of fish sought. The flasher produces a full 360° of flash as it moves.

17 Claims, 7 Drawing Sheets

DUAL ACTION MULTI-LINE FISH ATTRACTOR

FIELD OF THE INVENTION

The instant invention relates to a fish attractor or flasher capable of dual action modes and of holding multiple fishing lines with no entanglement and having an even rotation rate over a range of trolling speeds while producing a full 360° of flash.

BACKGROUND OF THE INVENTION

Fish attractors, also known as flashers, are well known to the fisherman who trolls for game fish in deep waters. A variety of such devices are known in the art. The particular shape and configuration of the flasher determines its pattern of motion and its rotation. The type of material used in its construction determines the degree of shine, reflection of light, or the "flash" of the device.

The flasher should not be confused with the spinner, which is small and attached to the leader next to the hook. Spinners are designed to appear as bait for the fish. Flashers are larger and are designed to look like another fish swimming through the water.

One end of a flasher is attached to the fishing line and held below the water's surface with the assistance of a downrigger assembly. The bait or lure and hook are thereafter attached to a leader which is fastened to the other end of the flasher. The flasher is pulled through the water and mimics the motion of a fish as it swims along.

Design patents for such devices do not divulge the materials, sizes or modes of motion, but such designs do contribute to the art. Gardemeyer has designed a trolling spoon to which the hook is directly attached. (U.S. Pat. No. Des. 153,676) Hazelquist in U.S. Pat. No. Des. 363,113 shows two embodiments of a fish attractor that is an elongated triangle with the legs bent to form "wings" at its rear portion. The second embodiment features a second bend in each "wing".

The most common form of flasher on the market today is generally in the shape of an elongated rectangle with rounded corners and having one end portion bent upward and the other end portion bent downward. Such devices have been made of a metal such as brass (Stackhouse, Canadian Patent No. 629,515), a molded plastic with sheets of metallic reflector tape on the top and bottom surfaces (Gaunt, U.S. Pat. No. 3,656,253), and molded transparent plastic with a reflective sheet sandwiched between two layers of the plastic (Smith, U.S. Pat. No. 4,122,624). Though various degrees of reflectiveness are exhibited by these devices, they can only be seen when the flat side is toward the observer.

Hansen teaches a form of trolling device designed to move through the water in a zig zag path. The device has an upright triangular rudder with angular wings extending from opposite sides of the rudder. The base of the triangle forms the leading edge of the device (U.S. Pat. No. 4,237,644).

The prior art devices have restricted flashing capabilities, have one type of motion pattern, usually erratic, and are designed to carry only one leader. There is a need for a flasher that can be seen over 360°, that can be used in more than one movement pattern which is geared to the variety of fish being sought, and that can carry more than one leader without the lines becoming entangled with each other.

BRIEF SUMMARY OF THE INVENTION

The present invention discloses a flasher that can be used with one or more leaders and provides flash visibility over a full 360°. The arrangement of the leaders prevents their becoming tangled and increases the chance of a fish biting. Different motion paths are possible and can be determined according to the particular fish being sought.

It is an object of the present invention to provide a flasher that can be seen from any angle and from an increased distance.

Another object of the present invention is to provide a flasher that has a regular rotation mode over the normal range of trolling speeds.

A further object of the present invention is to provide a flasher that has options of use to effectively catch a variety of different types of fish.

A still further object of the present invention is to have a flasher that has two completely different actions, rotation and barrel roll, to increase its versatility.

An object of the present invention is to provide a flasher that can use three lures at one time, and whereas the lures can be all the same, all different, or in combination and will not become entangled.

Another object of the present invention is to provide a flasher that creates less drag when pulled through the water during retrieval.

A further object of the present invention is to provide a flasher that is inexpensive and easy to manufacture.

Other features and advantages of the invention will be seen from the following description and drawings.

DETAILED DESCRIPTION OF THE INVENTION

Figure 3:
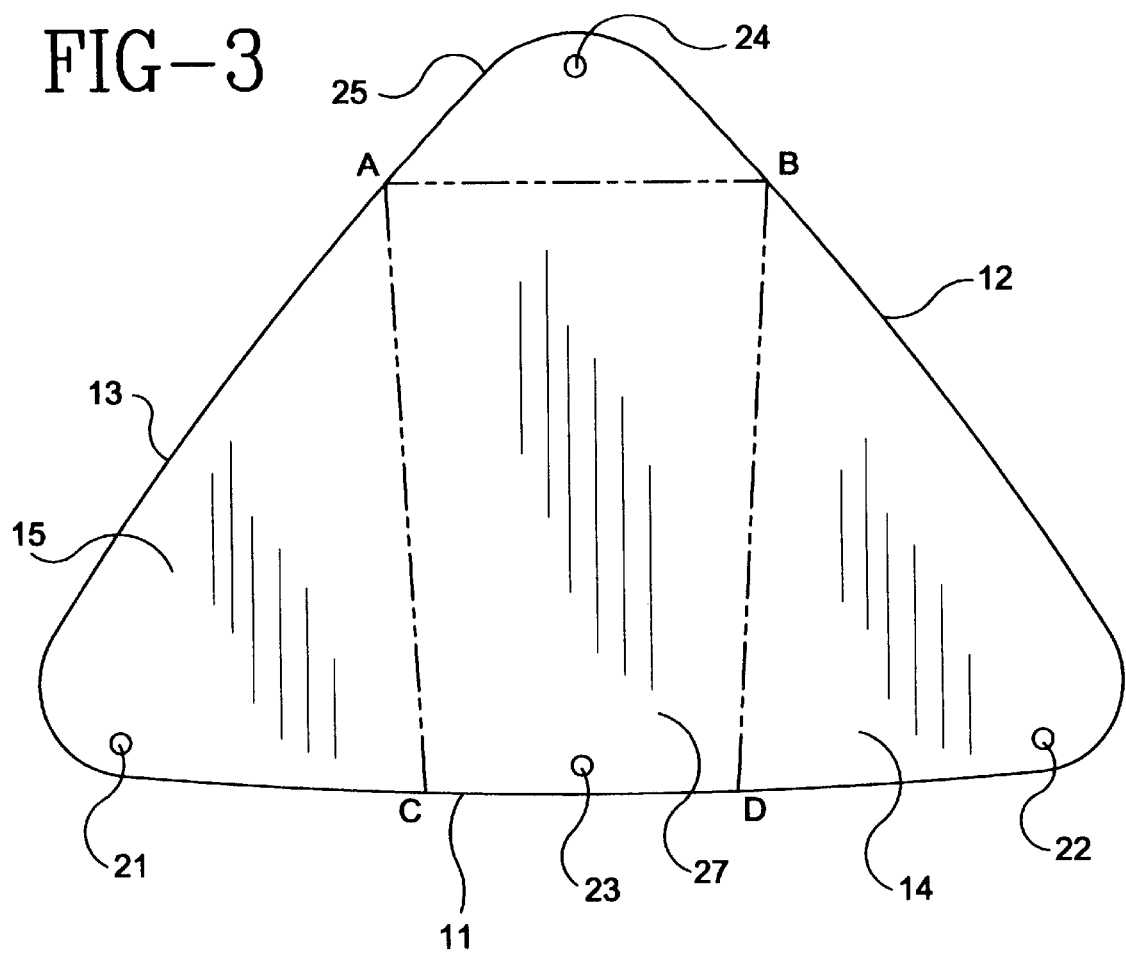
FIG. 3 is a top plan view of the blank for the flasher, with fold lines indicated.

The flasher 10 of the instant invention is made from a blank seen in FIG. 3 that is substantially triangular with the base 11 sightly longer then the two equal legs 12 and 13. The corners of the triangle are rounded. There are two co-planar fold lines A–C and B–D extending from points A and B on the legs 13 and 12 near the apex 25 to points C and D on the base 11. Lines A–C and B–D are not parallel, but converge, though they do not meet, from apex to base. Angles BAC and ABD are equal. These angles can range from 68° to 89.5° and determine the rotation speed of the flasher 10 as it moves through the water. If the angles are greater than 89.5° the rotation will be too slow for the desired effect, and angles less than 68° produce a rotation that is too fast. The ideal range is between 82° and 88°. This range produces a slow rotation when the flasher is drawn through the water at the usual trolling speeds of 0.5 to 3.5 mph, making it possible for the intended prey to bite the lure or bait. The flasher 10 rotates about its central axis at 28 rpm throughout this trolling speed range.

Figure 1:
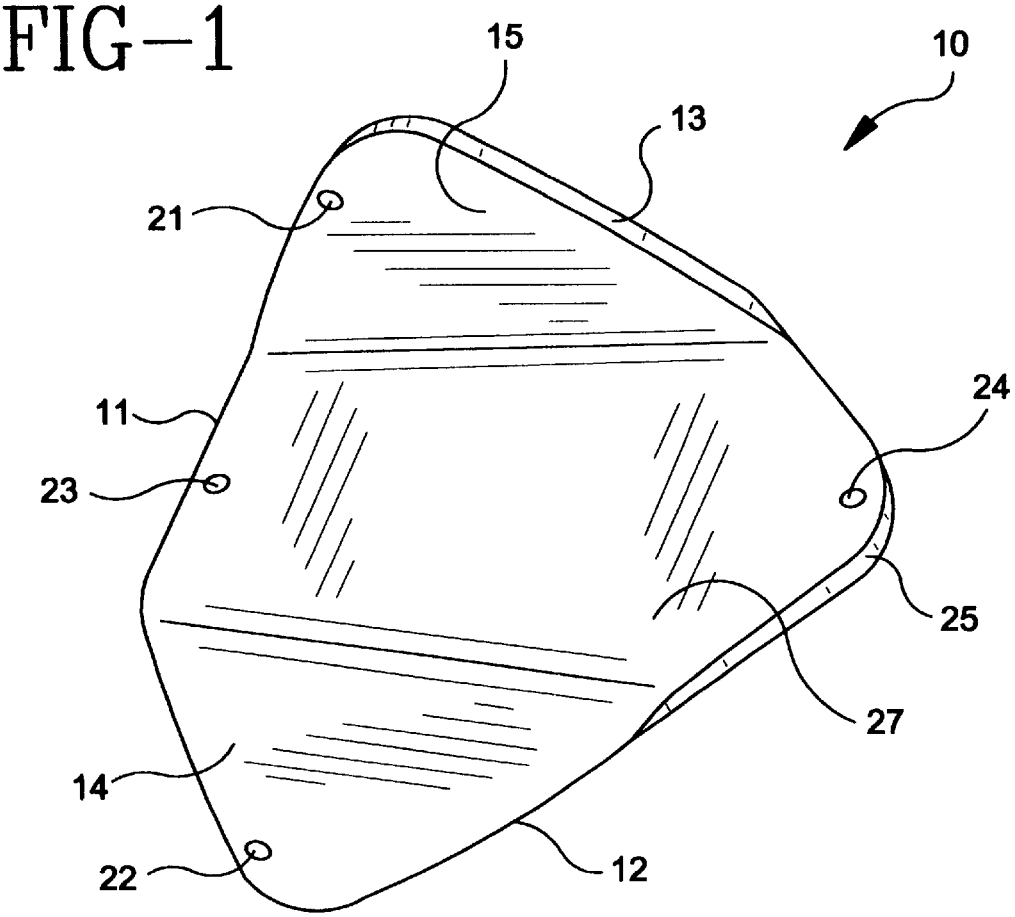
FIG. 1 is a perspective view of the flasher of the instant invention.
Figure 2:
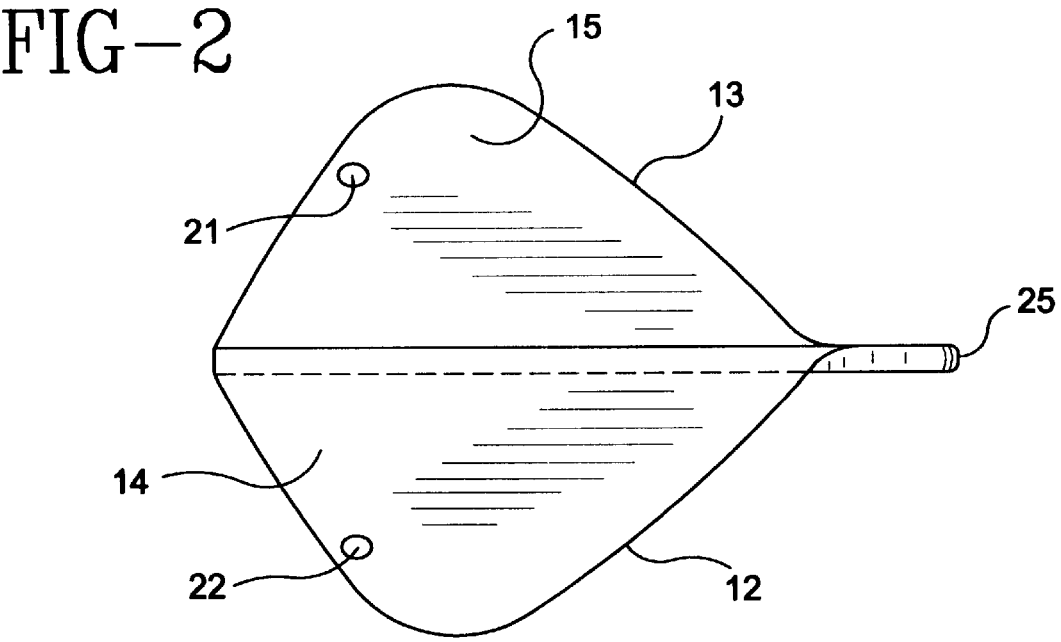
FIG. 2 is a right side elevational view of the flasher.
Figure 4:
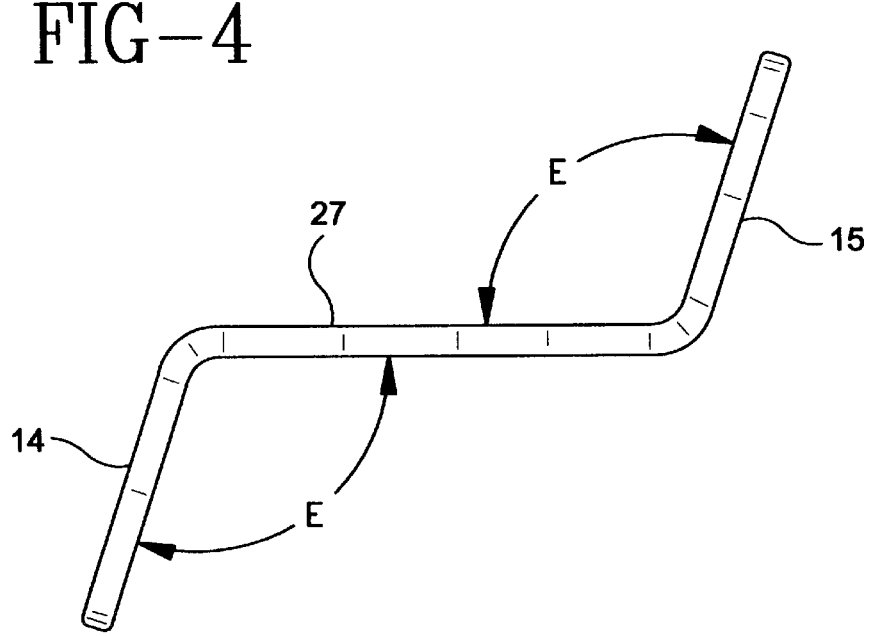
FIG. 4 is a schematic front elevational view of the flasher.

The two leg portions of the triangle are bent along the fold lines in opposite directions, one upward (leg 13) and the other downward (leg 12) from the plane of the blank, forming two "wings" 15 and 14. This can be seen in FIG. 4. The bend angles E of both wings are the same and can range from 5° to 175°. The preferred angle is between 100° and 115° and optimum performance is achieved at 105°. Angle E has more to do with the amount of visual flash than with the rotation speed of the flasher. When angle E is between 100° and 115° there is 360° visual flash when the flasher is viewed from the side or at an angle as it is towed through the water. Thus this flasher is easily visible to fish from any angle and at a considerable distance. Bending the leg portions in the opposite directions (leg 13 downward and leg 12 upward) causes the flasher 10 to rotate in the opposite direction. FIGS. 1 and 2 show different views of the blank properly bent to form the flasher 10 and reveal the planar visibility at different angles.

Figure 5:
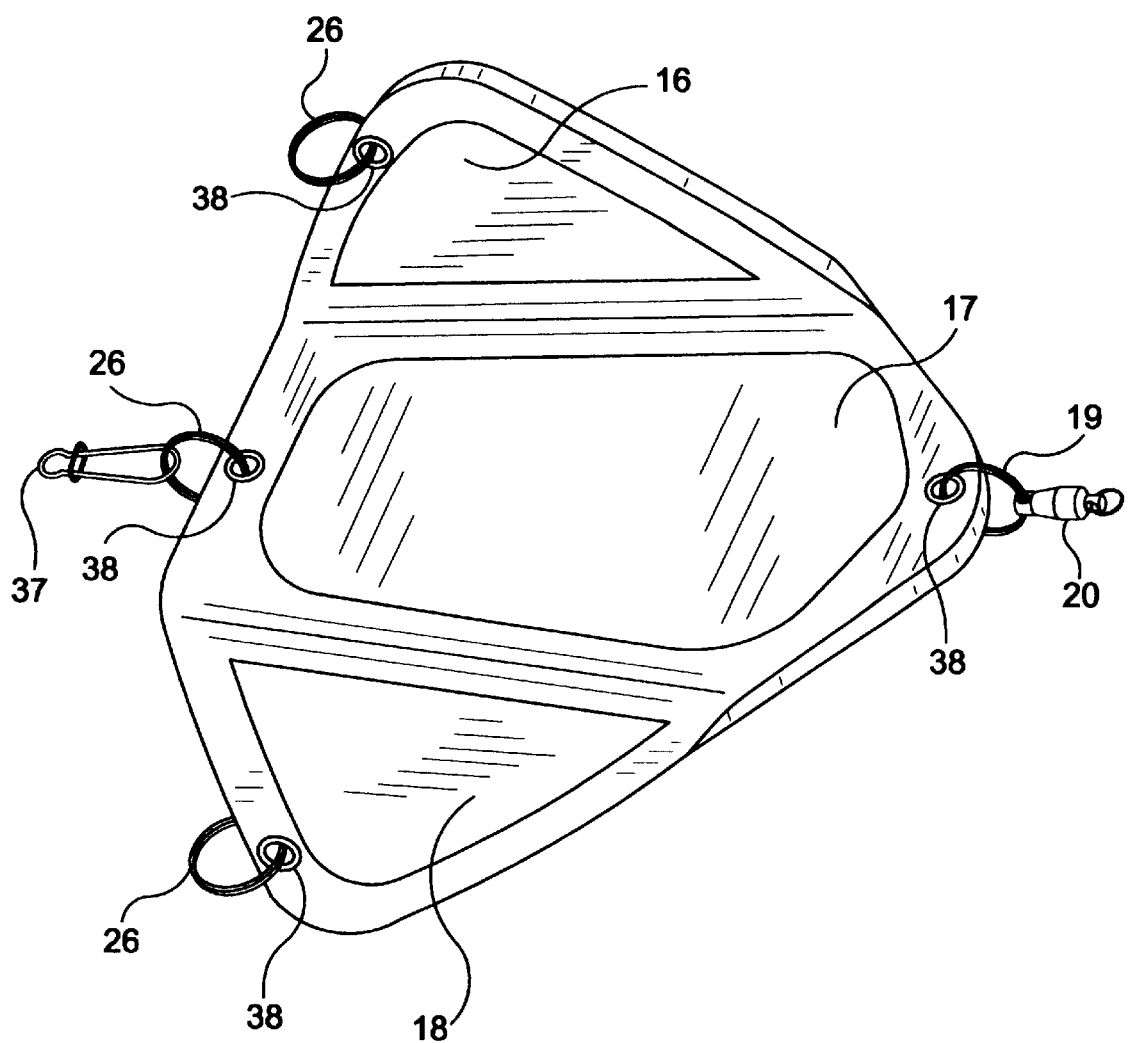
FIG. 5 is a perspective view of the flasher with the reflective panels in place.

The blank can be made from any moldable rigid material capable retaining its configuration and a material that is resistant to water, both salt and fresh. It is best made from a transparent plastic, though an opaque material can be used. The upper and lower surfaces of the central portion 27 and wings 14 and 15 of the flasher provide six surfaces. The flash is obtained by affixing reflective tape panels to all six surfaces. The flasher can also be made in two layers of transparent material with the reflective tape sandwiched between them. FIG. 5 shows the flasher 10 with reflective tape panels 16,17 and 18 in place on the three upper visible surfaces. Because of the shape of the flasher, the reflective surfaces, the controlled rotation, and the angles of the wings, the flasher can be seen over an entire 360° range.

The flasher 10 can also be made of a colored material, or can be painted. Different colors of paint or reflective tape produce the best effect. One color can be used on the wings 14 and 15 and another on the central portion 27. The use of two or more colors provides better contrast and visibility as the flasher rotates.

The flasher 10 has an aperture 24 at the apex 25 for attachment of a ring 19 and ball bearing swivel 20 to which is attached the fishing line 30. There are three apertures along the base, one toward the end of each wing (21 and 22), and one in the center 23, through which are placed rings 26 that are used to attach clips 37 with the leaders 28. A hook 29 with the desired bait or lure is affixed to each leader. (FIGS. 5 and 6) To prevent excessive wear on the inside of the apertures 24, 21, 22, and 23, reinforcing grommets 38 are placed in each aperture.

Figure 7:
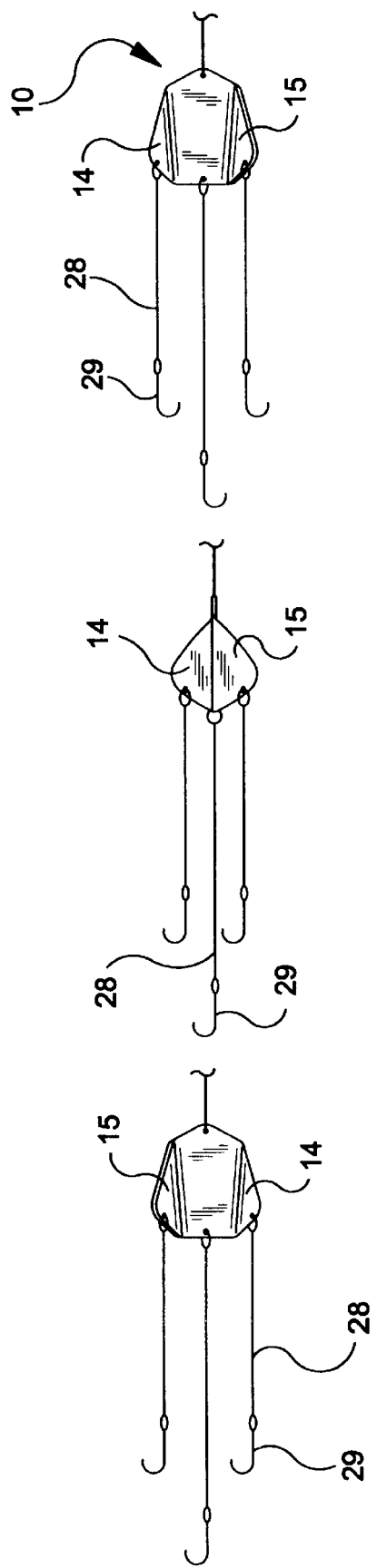
FIG. 7 is schematic side view of the rotation of the flasher, with three leaders, as it moves through the water.
Figure 8:
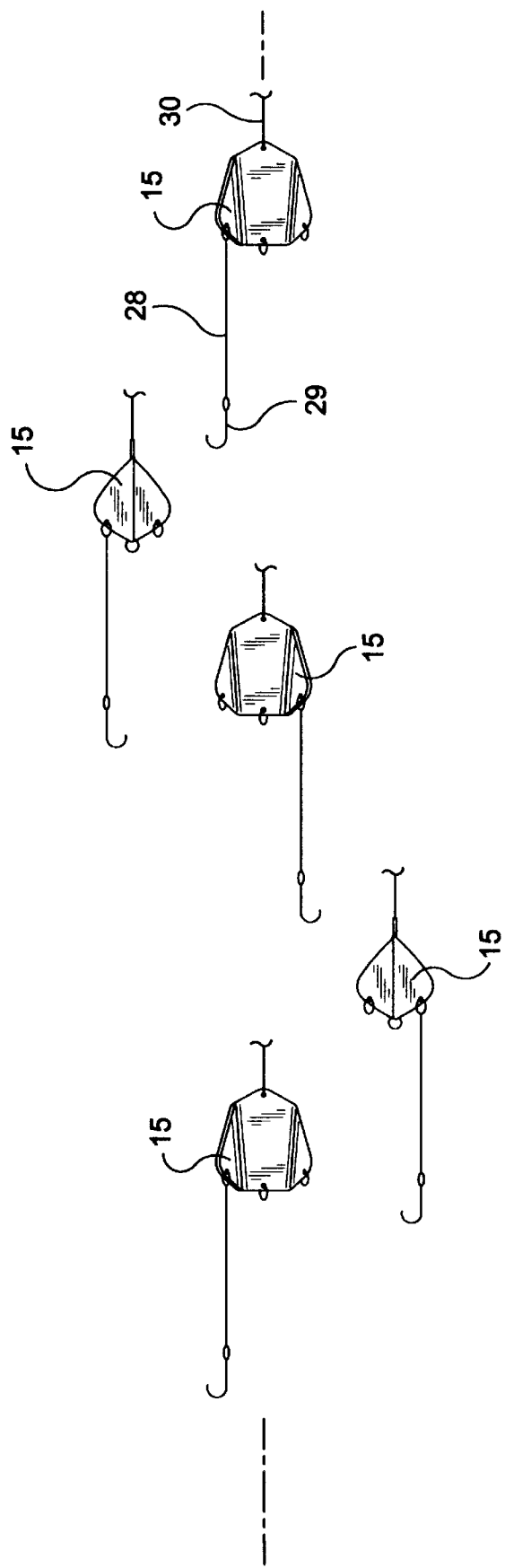
FIG. 8 is a schematic side view of the barrel roll motion of the flasher, with one leader, as it moves through the water.
Figure 9:
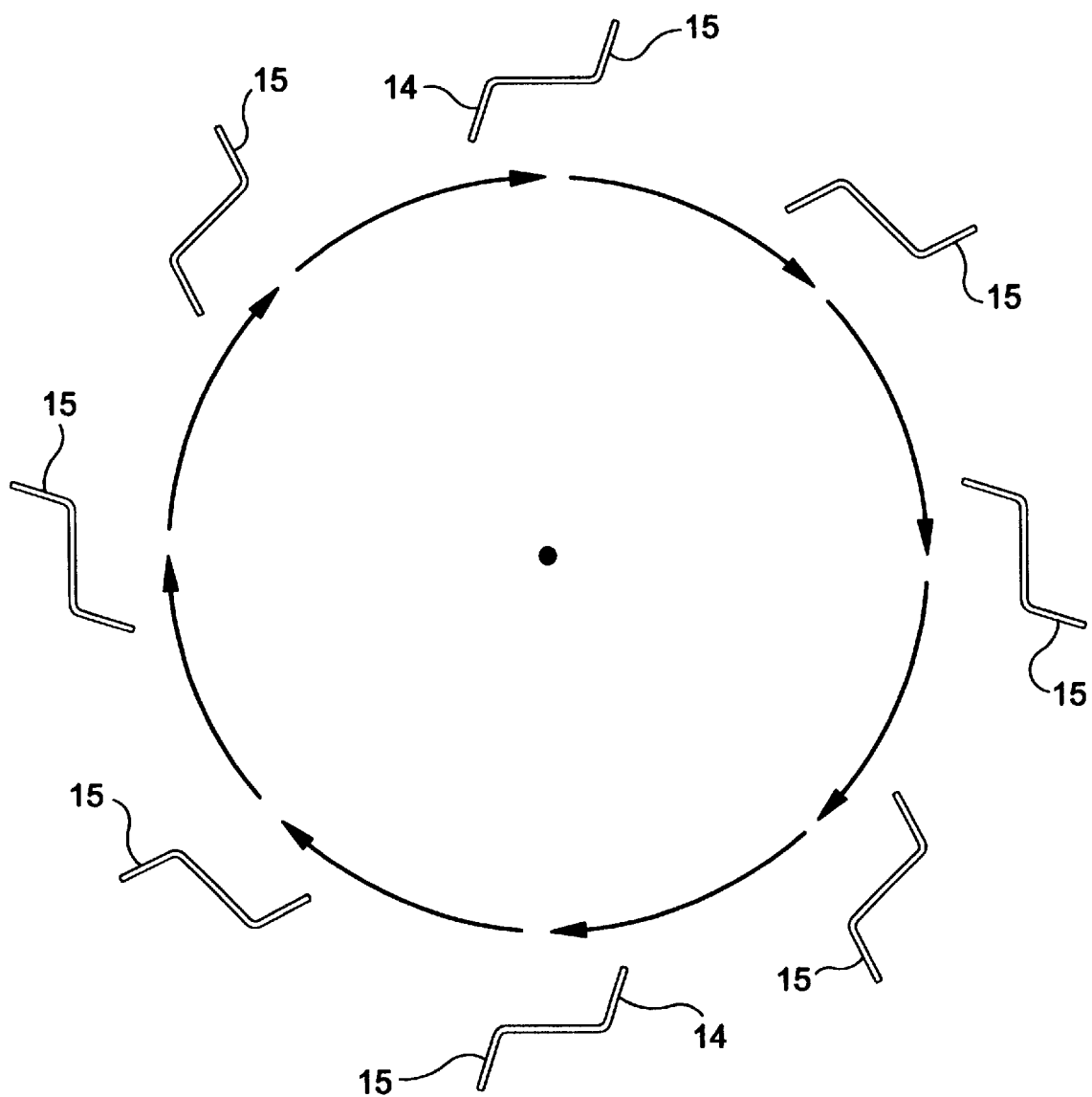
FIG. 9 is a schematic front end view of the barrel roll motion of FIG. 8.

The flasher 10 is designed for use with one, two, or three leaders 28. The placement of the leaders determines the mode of rotation of the flasher as it is pulled through the water. One leader attached at a wing aperture 21 or 22 (outside attachment) produces a three foot (0.9 m) (diameter) barrel roll instead of rotation about the central axis. The barrel roll motion is illustrated in FIGS. 8 and 9. Use of leaders at both wing apertures 21 and 22, one leader at the center aperture 23, or leaders at all three apertures produces rotation about the central axis which was previously noted and is illustrated in FIG. 7. The controlled slow rotation of the flasher over a wide speed range enables the use of more than one leader without the leaders becoming entangled. Neither the rotation nor the barrel roll will alter the intended action of the lure or bait selected.

When three leaders are used, best results are achieved when the center line is between 20 inches (50 cm) and 40 inches (100 cm) in length and the outside lines are between 9 inches (23 cm) and 12 inches (30 cm) in length.

The mode of use is determined by the variety of fish sought. One leader, 2 feet (0.6 m) to 6 feet (2 m) long fastened in the center aperture 23 and using a lure or cut bait will attract brown trout and lake trout. Use of two leaders 9 inches (23 cm) to 12 inches (30 cm) in the wing apertures 21 and 22 with squid or spoons will attract Cohos and other salmon. One leader in a wing aperture will also attract salmon. When the combination of three leaders is used the whole assembly looks like a small school of bait fish and functions well for general fishing purposes.

The design of the flasher 10 makes retrieval under water easier since there is less drag than with other devices having an upturned nose or front panel.

The flasher can be made in a wide variety of sizes, though good performance is achieved with a triangular blank, referring to FIG. 3, having a base 11 of 6.75 inches (17 cm) and legs 12 and 13 of 5.25 inches (13 cm). The distance A–B is 3 inches (7.6 cm) and C–D is 2.38 inches (6 cm) to achieve angles (BAC and ABD) of 87°. The thickness of the blank is determined by the material used. A plexiglass prototype 3/16 inch (5 mm) thick functions well.

Figure 6:
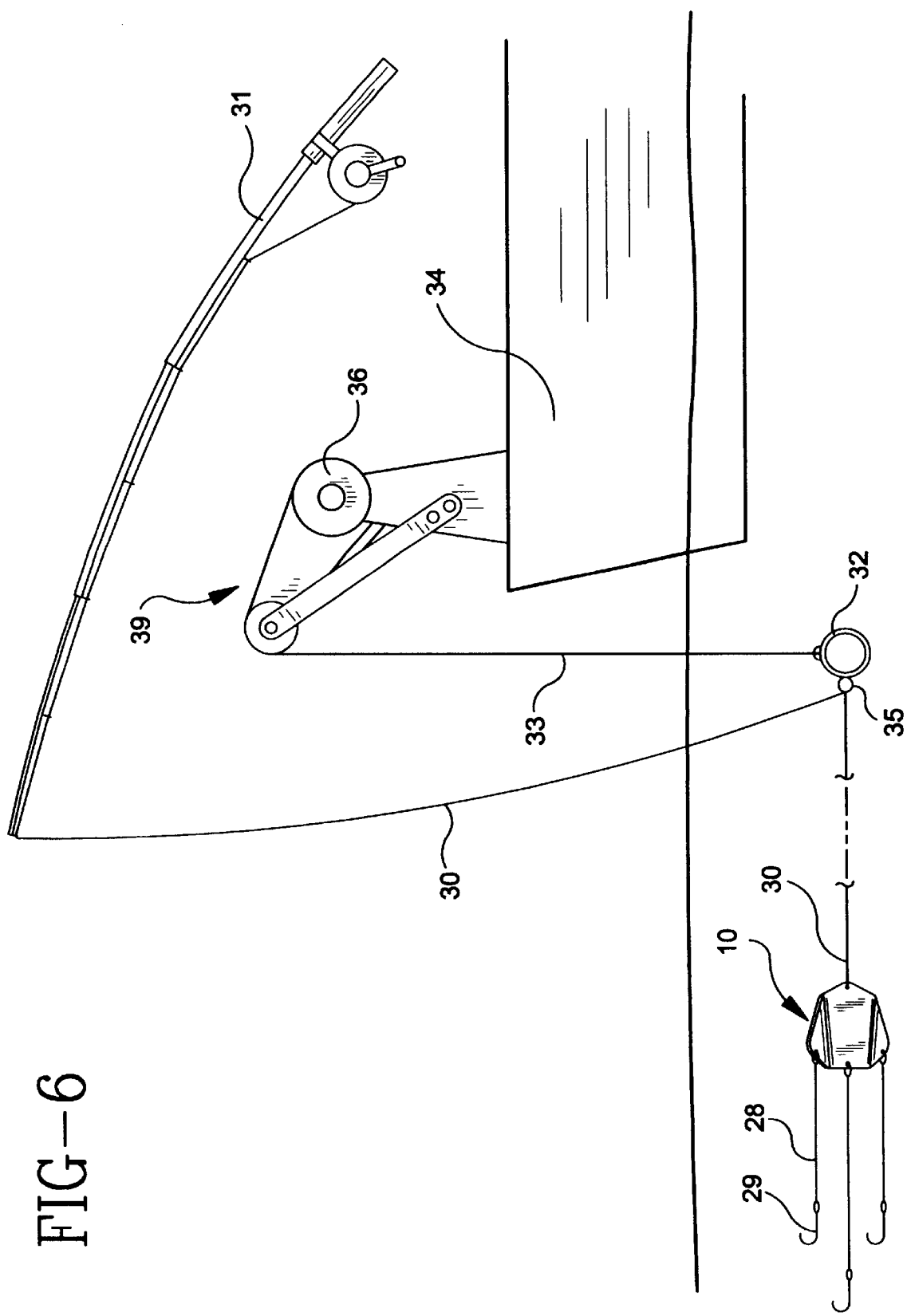
FIG. 6 is a side schematic view of the flasher in use showing the boat, fishing line and downrigger assembly.

The flasher of the instant invention is designed for use with a downrigger assembly 39 located at the stern of a boat 34 as shown in FIG. 6. A winch 36 releases a cable 33 which has a weight 32 at its end, until the weight 32 is at the desired depth. The fishing rod 31 is placed in a holder which is attached to the downrigger assembly 39 or to the boat 34. The fishing line 30 extends to the weight 32 where it is held by a release 35 attached to the weight 32. Thereafter the fishing line 30 is attached to the flasher 10 fitted with the leaders 28 in the selected positions and having the required bait or lures on the hooks 29. As the boat moves through the water the flasher is drawn at a steady speed and either rotates or barrel rolls depending on the number and positions of the leaders. The fish can see the flasher from any angle and can bite at one or more lures.

While one embodiment of the present invention has been illustrated and described in detail, it is to be understood that this invention is not limited thereto and may be otherwise practiced within the scope of the following claims.

I claim:

1. A flasher for attracting fish and adapted for connection between a fishing line and at least one leader holding a hook and bait or lure, said flasher comprising:

a flat central member having non-parallel sides, an upper surface and a lower surface, a rearward end in the form of a substantially straight edge, a forward end in the form of a triangle with base line and apex, the base line terminating at the forward end of each of said sides and forming an acute angle therewith, said angles being equal and said straight edge being at least one-half the length of said base line;

said central member having an aperture disposed at the center of the rearward end for attachment of the leader and an aperture disposed at the apex for attachment of the fishing line;

two substantially triangular wing members coextensive with the sides of said central member and having an upper surface and a lower surface, said wing members extending in mutually opposite directions from said central member, and each wing member forming an angle E therewith; and an aperture disposed at the outermost rear edge of each of said wing members for attachment of the leader;

whereby when said flasher is pulled through the water in a forward direction it is caused to rotate.

2. A flasher as in claim 1 wherein the length of each of said wing members is substantially more than half the length of the central member.

3. A flasher as in claim 1 further comprising light reflective means affixed to the upper and lower surfaces of said central member and said wing members, whereby when the flasher is caused to rotate 360° of visual flash are produced for attracting the fish at any angle or elevation.

4. A flasher for attracting fish and adapted for connection between a fishing line and at least one leader holding a hook and bait or lure, said flasher comprising:

a blank made from a planar sheet of rigid, moldable material generally in the shape of a triangle;

said blank having an upper surface, a lower surface, an apex, a base, two legs, and two non-parallel fold lines extending from points on each leg situated near and equidistant from the apex and converging to two points along the base;

said fold lines forming equal acute angles with a line between the points on each leg, and defining a central portion and two wings;

said central portion being divided by the line between the points on each leg into a forward portion and a rearward portion, said forward portion being substantially a triangle and said rearward portion being substantially a trapezoid, a rearward base of said trapezoid being at least one-half the length of a forward base;

said two wings being substantially triangular, extending in mutually opposite directions from the plane of the central portion, and forming equal angles E therewith; and apertures means disposed at the apex and at a central point and each end of said base;

whereby when the fishing line is attached at the apex aperture and the leaders are attached at the central aperture, the two end apertures, or all three apertures, the device will rotate uniformly in one direction on its axis as it is pulled through the water in a forward direction and whereby when the leader is affixed at one end aperture only the device will barrel roll as it is pulled through the water.

5. A flasher as in claim 4 wherein the length of the base is greater than the length of the two legs.

6. A flasher as in claim 4 wherein the two legs are of equal length.

7. A flasher as in claim 4, wherein the combined surface area of the two wings is substantially the same as the surface area of the central portion.

8. A flasher as in claim 4 having panels of light reflecting means affixed to the upper and lower surfaces of the central portion and each wing for reflecting light over the surfaces of the device, for providing 360° of visual flash as the device is pulled through the water and for attracting the fish at any angle or elevation.

9. A flasher as in claim 8 wherein the panels of light reflecting means are of more than one color for better attracting the fish.

10. A flasher as in claim 4 wherein the equal acute angles formed by the fold lines and the line between the points on each leg are between 68° and 89.5°.

11. A flasher as in claim 4 wherein the equal acute angles formed by the fold lines and the line between the points on each leg are between 82° and 88°.

12. A flasher as in claim 4 wherein the equal angles E formed by each wing and the plane of the central portion are between 5° and 175°.

13. A flasher as in claim 4 wherein the equal angles E formed by each wing and the plane of the central portion are between 100° and 115°.

14. A flasher as in claim 4, wherein the equal angles E formed by each wing and the plane of the central portion are 105°.

15. A flasher as in claim 4 wherein the blank has rounded corners.

16. A flasher as in claim 4 made of a colored material.

17. A flasher as in claim 4 painted at least one color.

\* \* \* \* \*